(No Model.) 2 Sheets—Sheet 2.
T. R. CATTELL & A. H. SUMMERS.
ANIMAL TRAP.
No. 378,767. Patented Feb. 28, 1888.
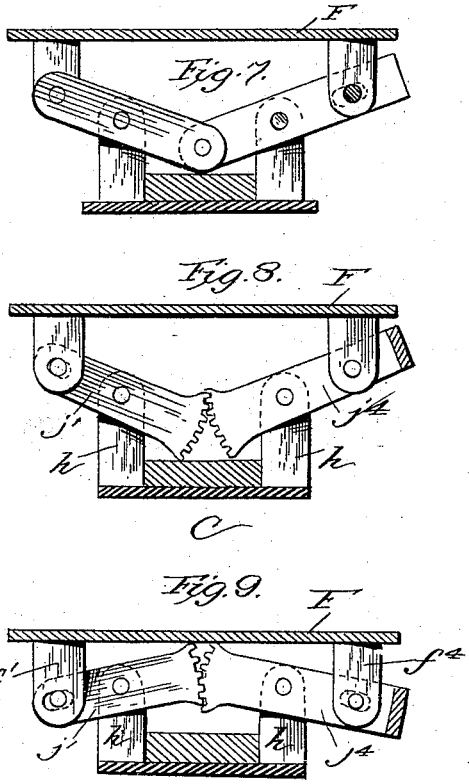
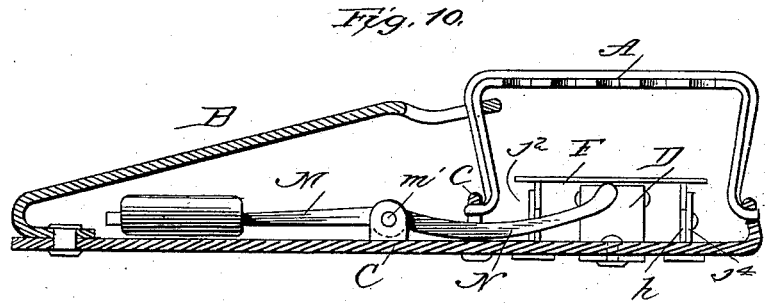
Attest.
F. L. Middleton
Inventors.
Thomas Randall Cattell,
Alfred Henry Summers,
by Ellis Spear
Atty.

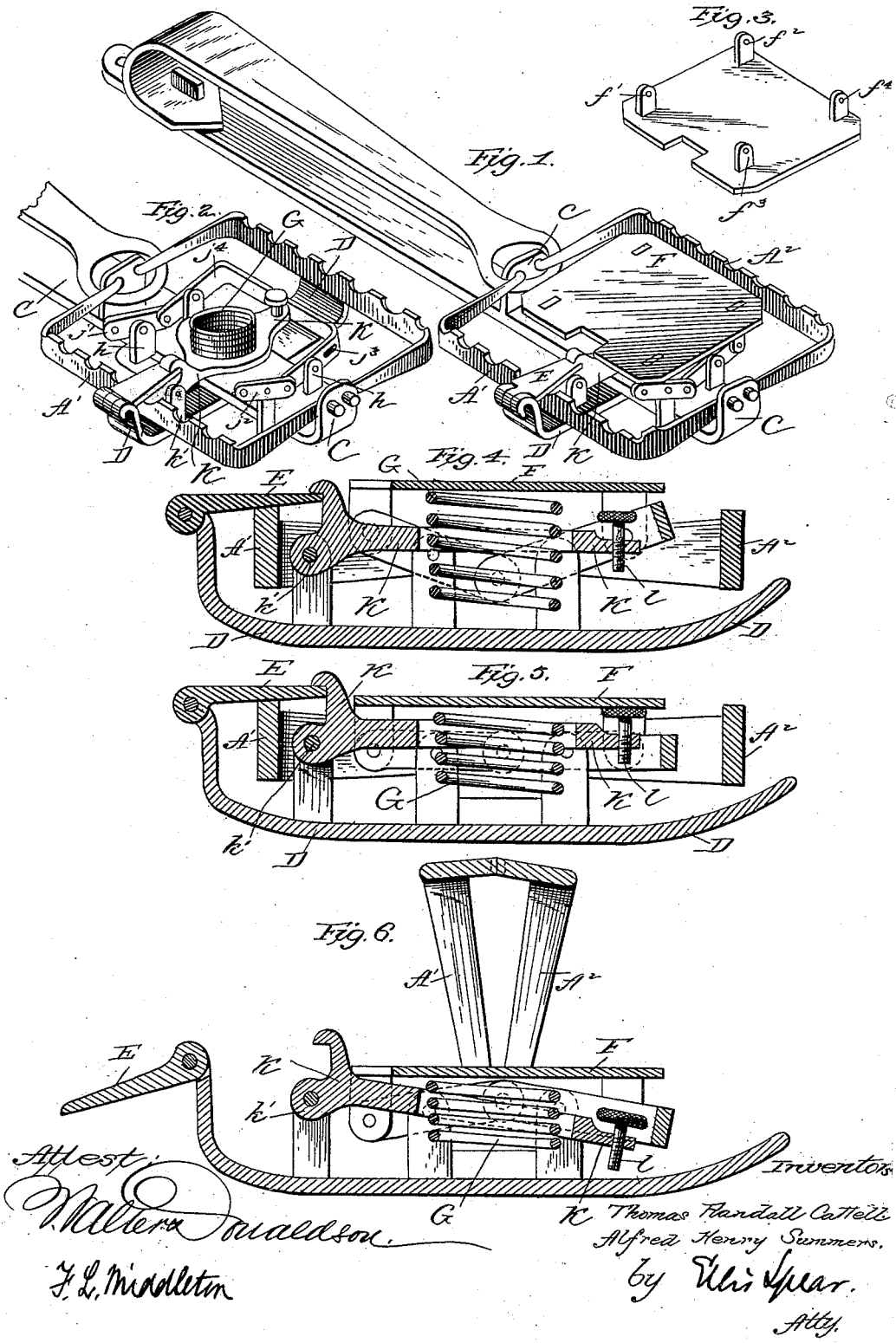

UNITED STATES PATENT OFFICE.

THOMAS RANDOLL CATTELL, OF WOOTTON WAWEN, AND ALFRED HENRY SUMMERS, OF TANWORTH, COUNTY OF WARWICK, ASSIGNORS OF ONE-HALF TO CYRIL WALKER, OF WOLVERHAMPTON, ENGLAND.

ANIMAL-TRAP.

SPECIFICATION forming part of Letters Patent No. 378,767, dated February 28, 1888.

Application filed May 28, 1887. Serial No. 239,721. (No model.) Patented in England May 21, 1886, No. 6,823.

*To all whom it may concern:*

Be it known that we, THOMAS RANDOLL CATTELL and ALFRED HENRY SUMMERS, subjects of Her Majesty the Queen of Great Britain, residing, respectively, at Wootton Wawen and Tanworth, both in the county of Warwick, England, have invented certain new and useful Improvements in Traps for Catching Animals, of which the following is a specification.

Our invention has reference to those traps for catching quadrupeds, birds, men, and other animals, which are closed by the action of a spring or weight when a catch is released by pressure being applied to a treadle or plate which holds the said catch in position, our objects being, first, to provide means whereby such traps can be set to close only when a certain pressure is applied to the treadle, thereby insuring the trap against being let off by a smaller animal than which it was set to catch, and, secondly, to so arrange the treadle that it will have the same effect in releasing the clip and letting off the trap no matter in whatever part of the treadle a downward pressure may be applied.

On the accompanying drawings, Figure 1 represents a rabbit-trap constructed according to our invention, the parts being in the position which they would occupy when the trap is set. Fig. 2 represents part of the same trap illustrated by Fig. 1, the treadle having been removed; and Fig. 3 represents an inverted view of the treadle of the same separately. Figs. 4, 5, and 6 are cross-sectional elevations of the same trap, illustrating its action, as hereinafter fully described; and Fig. 7 is a part end elevation of the same. Figs. 8, 9, and 10 represent modifications of the same, as hereinafter fully described.

$A'$ $A^2$ are two jaws of the trap.

B is the spring by which the said jaws are closed.

C is the bottom piece or trap-frame to which the jaws are hinged.

D is the cross-piece connected to the bottom piece, C, and carrying the clip E for maintaining one of the jaws open, all of the ordinary construction.

F is a treadle, pressed upward by the coiled spring G, which acts between the under side of the treadle F and the bottom part of the frame C.

The treadle F may be hinged to the trap-frame in the ordinary manner, so as to be capable of an up-and-down motion; but we prefer to hinge it to the frame by the arrangement of mechanism represented on the drawings, so that it will have the same effect in releasing the clip E no matter on whatever part of the treadle a downward pressure, as caused by an animal running over it, may be applied. The said arrangement of mechanism consists of four levers, $j'$ $j^2$ $j^3$ $j^4$, (the two latter are preferably formed together,) each pivoted to a bracket, $h$, fixed to or formed with the frame C. The levers are hinged at their outer ends to ears $f'$ $f^2$ $f^3$ $f^4$, formed on the treadle underneath, and their inner ends are pinned loosely together. The distances from the fulcra of the levers to the points where they are jointed to the treadle are equal, and so are the distances from the fulcra to the points where they are joined together. By this arrangement of levers the treadle will move up and down in parallel planes.

Underneath the treadle F is a lever, K, pivoted to the trap-frame at $k'$, and preferably provided with a set-screw, $l$, at its outer end. When the trap is set, (see Fig. 4,) there is a short space of, say, for instance, a quarter of an inch between the top of the lever (or when a set-screw is used between the end of the set-screw $l$) and the under side of the treadle. The trap is "let off" when the lever K has moved low enough for the catch to release the lever. (See Fig. 6.) It will be seen that in this case the treadle F must be moved downward against the pressure of the spring G through the space of a quarter of an inch before it will come into contact with the set-screw $l$ and begin to move the lever K downward to let off the trap. The set-screw $l$ may be carried by the treadle to act upon the end of the lever, instead of being carried by the lever to act upon the treadle. By adjusting the set-screw $l$ the distance through which the treadle F will have to move and the amount the spring G is compressed before depressing the lever K and releasing the lever E can be regulated so as to make the trap adjustable to catch animals of different weights.

Figs. 8 and 9 illustrate a modification of the mechanism for giving a parallel motion to the treadle, the meeting ends of the levers $j'$ $j^2$ $j^3$ $j^4$ being formed as toothed sectors and gearing together, instead of being pinned together. The treadle is represented in its highest position in Fig. 8 and in its lowest position in Fig. 9.

As a modification of our invention, instead of forming the catch on a lever beneath the treadle, as above described, the catch may be formed on the treadle in the ordinary manner and the said lever may be dispensed with. In this arrangement of our invention we simply provide a spring or counter-weight underneath the ordinary treadle to prevent its going off until a certain pressure has been applied to it.

Our invention can also be applied to traps for catching quadrupeds, birds, men, and other animals, whether such traps are provided with a single treadle and catch or two or more treadles and catches similarly as above described with reference to a spring rabbit-trap, such variations only being made in the parts as will be required to adapt them to the various traps to which they are applied.

As a further modification of our invention, instead of employing a spiral or other spring, which has to be compressed to let off the trap, as above described, a counter-weight may be employed and arranged to be raised when a certain pressure is exerted on the treadle. This is illustrated by Fig. 10, in which a lever, M, is jointed to the frame at $m'$, and provided with a counter-weight, N, at one end. The other end of the lever acts upon the treadle, which is thus kept pressed upward by the counter-weight N, which is preferably made adjustable on the lever M, so that the pressure on the treadle at which the trap will go off can be varied as desired.

In conclusion, we wish it to be understood that we do not limit ourselves to the precise details herein described and illustrated, as the same may be varied without departing from the nature of our invention; but, Having now particularly described and ascertained the nature of our said invention and in what manner the same is to be performed, we declare that what we claim is—

1. The combination, in a trap, of pivoted spring-jaws, devices for holding said jaws open, a bait-platform, F, a releasing-lever arranged beneath the platform F and adapted to be acted upon thereby to release the jaws, and a pressure device arranged to act upon the under side of the platform, said device being adapted to take up the weight upon the bait-platform to a certain point and prevent the trap from springing, but to allow the platform to operate the releasing-lever when the weight upon the platform exceeds the tension of the pressure device, substantially as described.

2. The combination, with the spring-jaws, of the catch E, the releasing-lever K, the platform F, mounted upon pivoted arms adapted to act upon the lever K, and the pressure device between the platform and the releasing-lever, whereby the said platform is held out of contact with the releasing-lever until the weight thereon overcomes the tension of the said device, substantially as described.

In testimony whereof we have each signed in the presence of two subscribing witnesses.

THOMAS RANDOLL CATTELL.
ALFRED HENRY SUMMERS.

Witnesses:
CHARLES BOSWORTH KETLEY,
WILLIAM CHARLES BATTEN.